US012109678B2

(12) United States Patent
Li

(10) Patent No.: US 12,109,678 B2
(45) Date of Patent: Oct. 8, 2024

(54) OAR GRIP

(71) Applicant: Hangzhou Suwei Sports Equipment Co., Ltd., Hangzhou (CN)

(72) Inventor: Xia Li, Hangzhou (CN)

(73) Assignee: HANGZHOU SUWEI SPORTS EQUIPMENT CO., LTD., Hangzhou (CN)

( * ) Notice: Subject to any disclaimer, the term of this patent is extended or adjusted under 35 U.S.C. 154(b) by 8 days.

(21) Appl. No.: 18/311,020

(22) Filed: May 2, 2023

(65) Prior Publication Data

US 2024/0123600 A1 Apr. 18, 2024

(30) Foreign Application Priority Data

Oct. 14, 2022 (CN) ........................ 202222708109.3

(51) Int. Cl.
*B63H 16/04* (2006.01)
*B25G 1/10* (2006.01)

(52) U.S. Cl.
CPC ............ *B25G 1/102* (2013.01); *B63H 16/04* (2013.01)

(58) Field of Classification Search
CPC ...................................................... B25G 1/102
See application file for complete search history.

(56) References Cited

U.S. PATENT DOCUMENTS 1,189,119 A * 6/1916 Jones et al. .............. B25G 3/04 15/146
1,871,146 A * 8/1932 Bosler ..................... F16B 2/065 403/55
1,892,338 A * 12/1932 Gentslinger ............. A46B 3/08 15/177
1,983,923 A * 12/1934 Stevens .................... B25G 3/36 15/176.3
2,199,018 A * 4/1940 Bahr ................... F16H 59/0278 16/441
2,666,221 A * 1/1954 Stepper .................... B25G 3/00 15/146
2,864,115 A * 12/1958 Champlin ............... A47L 13/24 15/177
4,155,582 A * 5/1979 Reisner .................... B25G 3/14 294/58
5,163,778 A * 11/1992 Botero .................... B63B 13/00 114/221 R (Continued)

*Primary Examiner* — Jason W San
(74) *Attorney, Agent, or Firm* — Muncy, Geissler, Olds & Lowe, P.C.

(57) ABSTRACT

An oar grip includes upper and lower shells, and an interior of each of the upper and lower shells is of a hollow structure. A handle base is disposed in a middle position inside the upper shell. A handle groove is provided in the handle base. Connecting columns are symmetrically disposed on two sides of the handle base. Threaded holes are provided in the connecting columns. A handle column is disposed in a middle position inside the lower shell. A handle hole is provided in the handle column. A tail end of the handle column extends into the handle groove. Stepped holes are provided on a left and right of the handle column, and the upper shell is fixedly connected to the lower shell by screws. The oar grip is formed by fixedly connecting the upper and lower shells through the screws, with an interior being of a hollow structure.

9 Claims, 4 Drawing Sheets

(56) References Cited

U.S. PATENT DOCUMENTS

| | | | | | |
|---|---|---|---|---|---|
| 5,387,143 | A * | 2/1995 | Pitman | B63H 16/04 | 16/DIG. 12 |
| 5,644,844 | A * | 7/1997 | Pink | A01D 34/90 | 30/276 |
| 5,755,644 | A * | 5/1998 | Breems | A61H 3/02 | 482/67 |
| 5,902,162 | A * | 5/1999 | Kot | B63H 16/04 | 114/221 R |
| 6,027,386 | A * | 2/2000 | Hains | B63B 13/00 | 114/221 R |
| 6,250,338 | B1 * | 6/2001 | Dempsey | E03C 1/04 | 4/678 |
| 7,534,965 | B1 * | 5/2009 | Thompson | H02G 3/22 | 174/152 G |
| 7,657,972 | B2 * | 2/2010 | Jenkins | B25G 1/06 | 16/108 |
| 7,670,077 | B2 * | 3/2010 | Jan | F16C 11/106 | 403/53 |
| 8,167,669 | B1 * | 5/2012 | Xie | B63H 16/04 | 440/102 |
| 8,381,358 | B1 * | 2/2013 | Frey | B25G 1/06 | 16/444 |
| 8,667,648 | B2 * | 3/2014 | Vierck | A01D 34/416 | 30/296.1 |
| 9,307,874 | B2 * | 4/2016 | Smith | A47K 7/04 | |
| 9,775,427 | B2 * | 10/2017 | Moreau | B25H 3/00 | |
| 10,946,947 | B1 * | 3/2021 | Tseng | B63H 16/04 | |
| 11,623,338 | B2 * | 4/2023 | Cafasso | A47L 25/005 | 16/422 |
| 2006/0168746 | A1 * | 8/2006 | Guyuron | A47K 7/04 | 15/23 |
| 2006/0174449 | A1 * | 8/2006 | Hughes | A61F 4/00 | 16/110.1 |
| 2013/0266442 | A1 * | 10/2013 | Lass | B63H 16/04 | 416/74 |
| 2016/0227917 | A1 * | 8/2016 | Stuart | B25G 1/102 | |
| 2019/0255374 | A1 * | 8/2019 | Constanza | A63B 24/0087 | |
| 2020/0230799 | A1 * | 7/2020 | Brown | A47J 45/071 | |
| 2021/0052938 | A1 * | 2/2021 | Rabiner | A63B 21/4035 | |
| 2024/0123600 | A1 * | 4/2024 | Li | B25G 1/102 | |

* cited by examiner

OAR GRIP

CROSS REFERENCE TO THE RELATED APPLICATIONS

This application is based upon and claims priority to Chinese Patent Application No. 202222708109.3, filed on Oct. 14, 2022, the entire contents of which are incorporated herein by reference.

FIELD OF TECHNOLOGY

The present disclosure belongs to the technical field of oars, and particularly relates to an oar grip.

BACKGROUND

Oars, as important supporting equipment for water boat and yacht sports such as kayaks, rowing boats, dragon boats and paddle boards, are a main tool for athletes to paddle boats forward, and are divided into single-blade oars and double-blade oars. For a single-blade oar, one end is a blade, and the other end is a grip. During paddling, an athlete holds an oar shaft with one hand and holds the grip with the other hand to keep paddling back and forth to move the boat forward. In the prior art, a shape of the grip is designed as a smooth curved structure for easy gripping. Since the grip is solid inside, the weight of the grip is heavy and increases the weight of the whole oar, which may increase the burden of the athlete and reduce the race performance. Therefore, it is necessary to provide an oar grip.

SUMMARY

The objective of the present disclosure is to provide an oar grip to solve the problems mentioned in the background art.

In order to achieve the above objective, the present disclosure adopts the following technical solution: An oar grip includes an upper shell and a lower shell capable of being buckled with each other, and an interior of each of the upper shell and the lower shell is of a hollow structure; a handle base is disposed in a middle position inside the upper shell, a handle groove is provided in the handle base, connecting columns are symmetrically disposed on two sides of the handle base, and threaded holes are provided in the connecting columns; and a handle column is upward disposed in a middle position inside the lower shell, a handle hole allowing a handle to penetrate through is provided in the handle column, a tail end of the handle column extends into the handle groove, stepped holes coaxial with the threaded holes are provided on a left and right of the handle column, and the upper shell is fixedly connected to the lower shell through screws sequentially screwed into the stepped holes and the threaded holes.

On the basis of the above solution and as a preferred solution of the above solution, a groove is provided in an edge of the upper shell, and an insertion strip matching the groove is disposed at an edge of the lower shell.

On the basis of the above solution and as a preferred solution of the above solution, a plurality of first reinforcing ribs are disposed around the connecting columns.

On the basis of the above solution and as a preferred solution of the above solution, a plurality of second reinforcing ribs are disposed around the stepped holes.

On the basis of the above solution and as a preferred solution of the above solution, each of two sides of the handle column is provided with a third reinforcing rib, and the third reinforcing ribs are connected to the stepped holes.

On the basis of the above solution and as a preferred solution of the above solution, guide holes coaxial with the stepped holes are provided in tops of the stepped holes, and diameters of the guide holes are greater than or equal to diameters of the connecting columns.

On the basis of the above solution and as a preferred solution of the above solution, the upper shell and the lower shell are respectively sleeved with a rubber cover.

On the basis of the above solution and as a preferred solution of the above solution, the rubber cover includes a round-hole-shaped sleeve attached to a side wall of the handle hole.

On the basis of the above solution and as a preferred solution of the above solution, the rubber cover includes cylindrical plugs extending into the stepped holes.

The present disclosure has the following beneficial effects: The oar grip is formed by fixedly connecting the upper shell and the lower shell through the screws, with an interior being of a hollow structure, so that the weight of the grip may be reduced, thereby allowing an athlete to paddle with less effort and being conducive to improving the performance. Since the reinforcing ribs are disposed inside both the upper shell and the lower shell, the strength of the upper shell and the lower shell may be improved. The upper shell and the lower shell are sleeved with the rubber cover, so that when the grip is tightly gripped by a hand, on the one hand, the frictional force between the palm and the grip may be increased, and on the other hand, the skin of the palm may be prevented from being rubbed.

BRIEF DESCRIPTION OF THE DRAWINGS

In order to more clearly illustrate the technical solutions of the embodiments of the present disclosure, accompanying drawings that are to be referred for description of the embodiments will be briefly described hereinafter. Apparently, the drawings described hereinafter merely illustrate some embodiments of the present disclosure, and a person of ordinary skill in the art may also derive other drawings based on the drawings described herein without any creative effort.

REFERENCE NUMERALS

1. Upper shell; 11. Handle base; 12. Handle groove; 13. Connecting column; 14. Threaded hole; 15. Groove; 16. First reinforcing rib;

2. Lower shell; 21. Handle column; 22. Handle hole; 23. Stepped hole; 24. Insertion strip; 25. Second reinforcing rib; 26. Third reinforcing rib; 27. Guide hole;

3. Rubber cover; 31. Round-hole-shaped sleeve; and 32. Cylindrical plug.

DESCRIPTION OF THE EMBODIMENTS

In order to make the objective, technical solutions and advantages of embodiments of the present disclosure clearer, the technical solutions in the embodiments of the present disclosure will be clearly and completely described below with reference to the accompanying drawings in the embodiments of the present disclosure. Apparently, the described embodiments are a part of the embodiments of the present disclosure, rather than all the embodiments. All other embodiments derived by a person of ordinary skill in the art from the embodiments of the present disclosure without any creative effort fall within the scope of protection of the present disclosure.

In the description of the present disclosure, it is to be understood that the terms "upper", "lower", "front", "rear", "left", "right", and the like indicate orientations or positional relationships based on the orientations or positional relationships shown in the accompanying drawings, are merely for convenience in describing the present disclosure and simplifying the description, and are not intended to indicate or imply that a referred device or element must have a particular orientation or be constructed and operated in a particular orientation, and thus they should not be construed as limiting the present disclosure.

Figure 1:
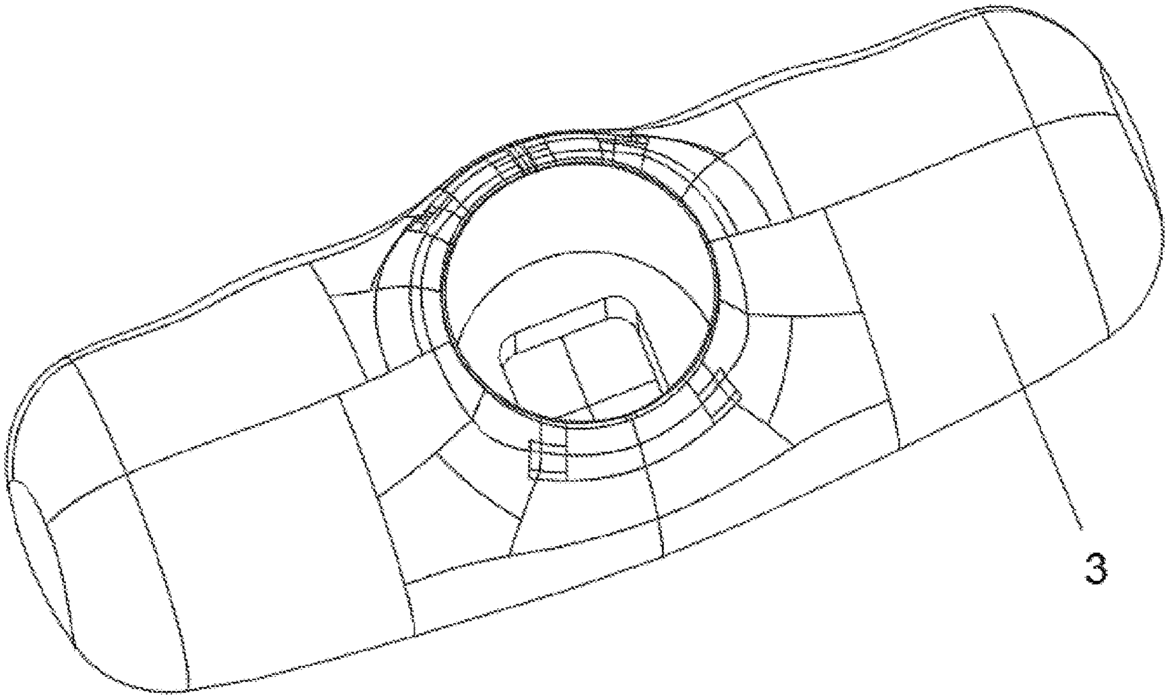
FIG. 1 is a schematic structural diagram of the present disclosure.
Figure 2:
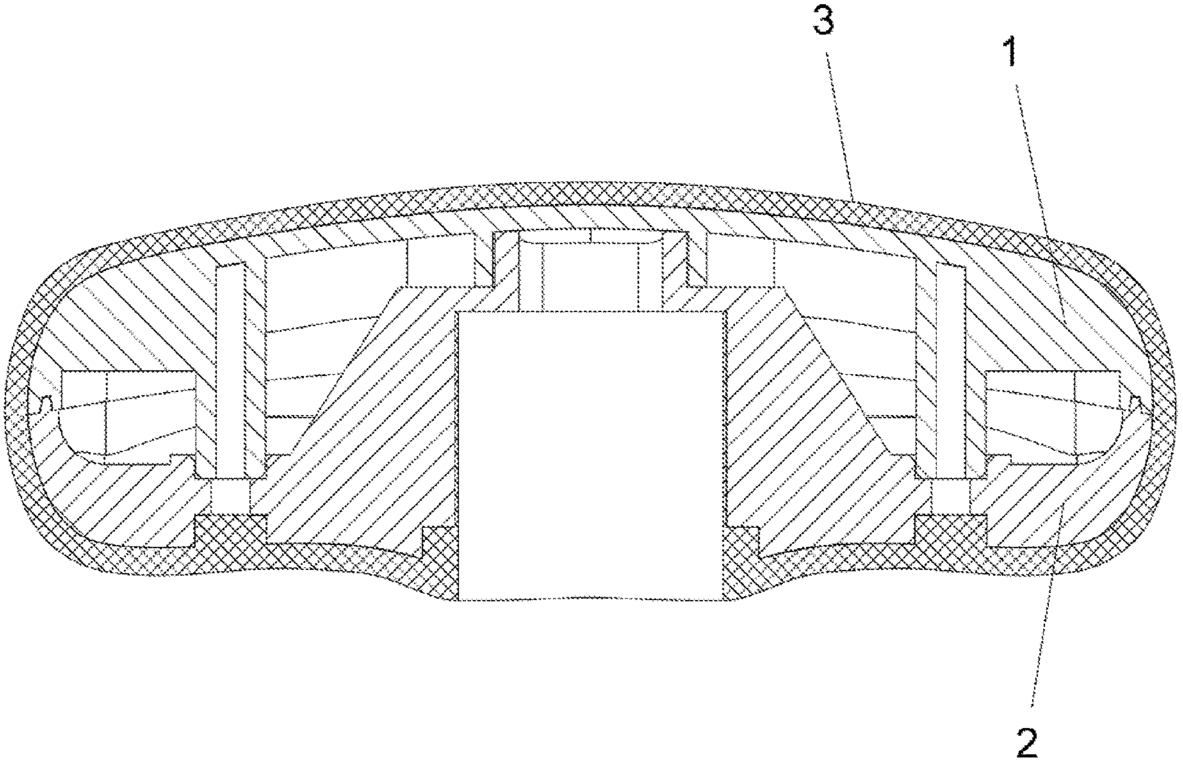
FIG. 2 is a sectional view of the present disclosure.
Figure 3:
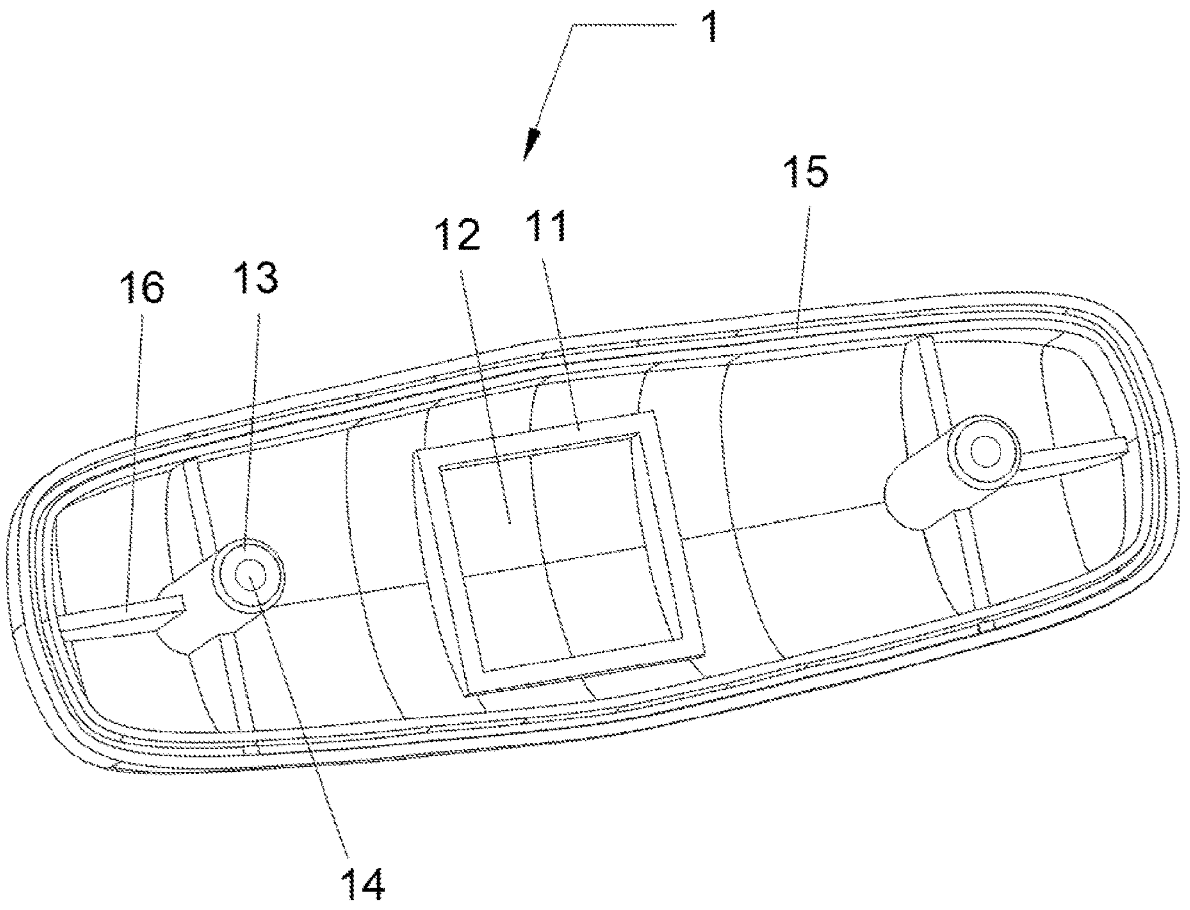
FIG. 3 is a schematic structural diagram of an upper shell.
Figure 4:
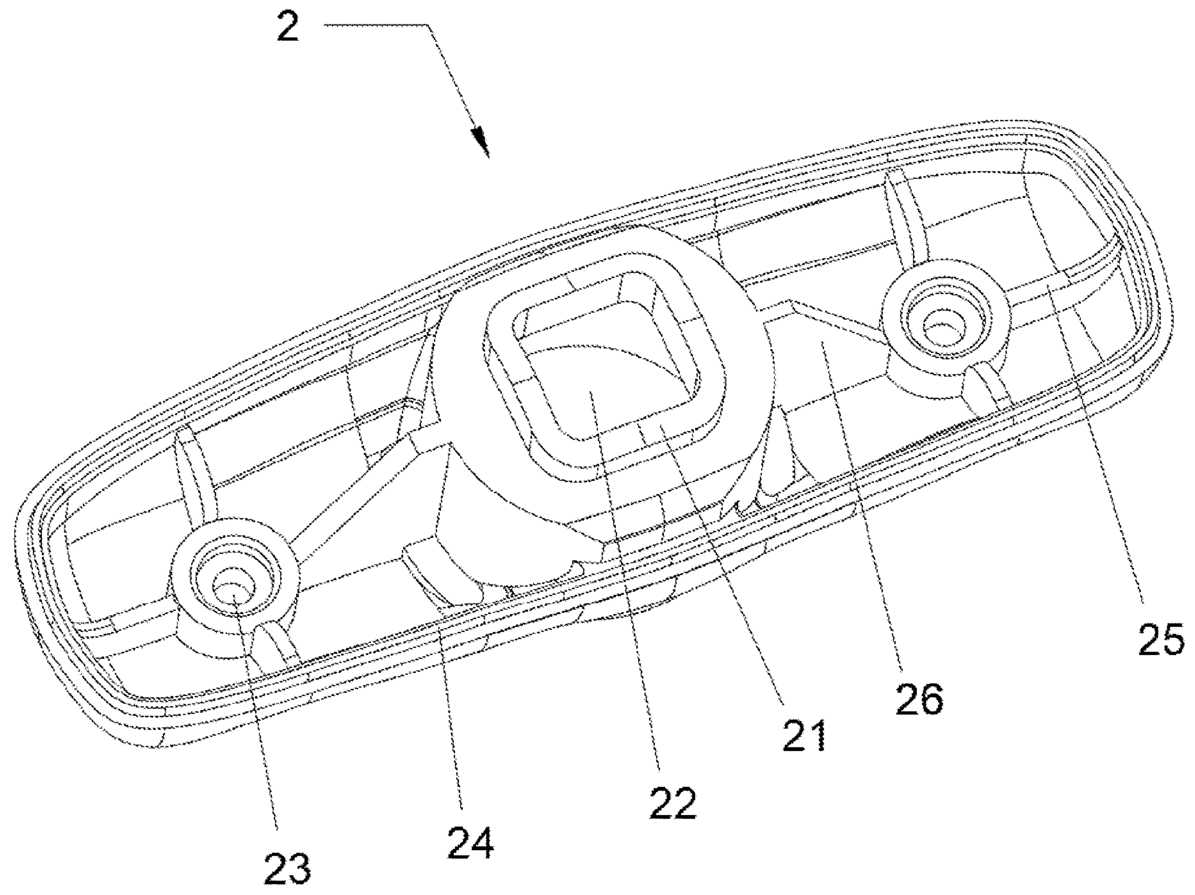
FIG. 4 is a schematic structural diagram of a lower shell.
Figure 5:
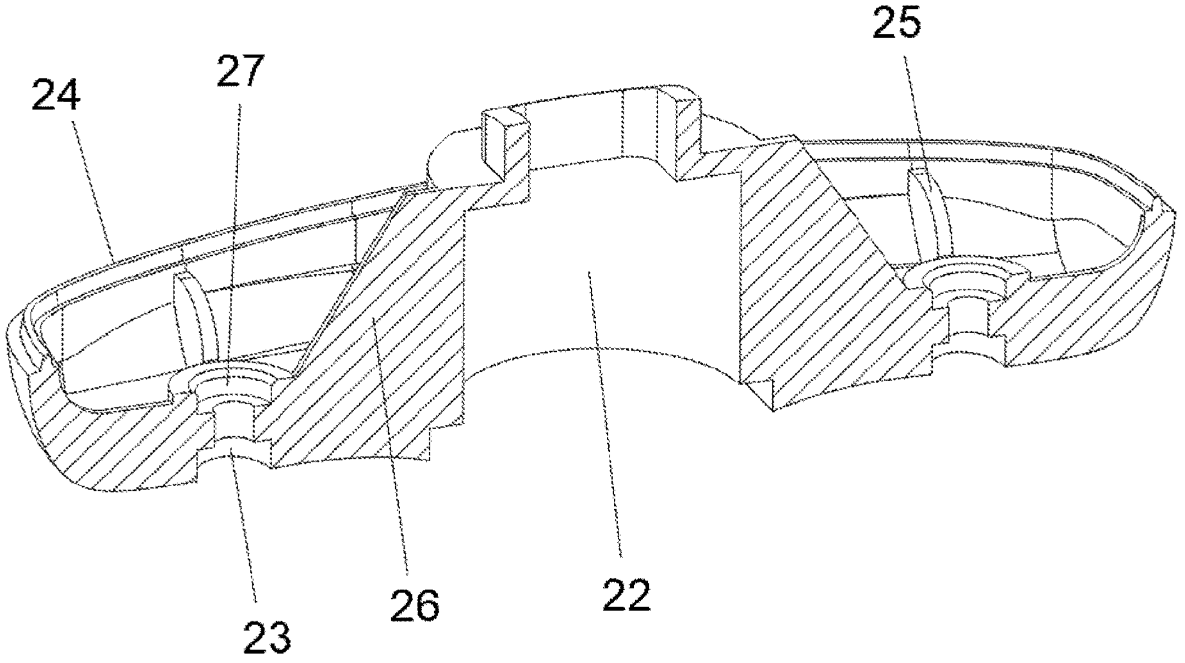
FIG. 5 is a schematic sectional view of a lower shell.
Figure 6:
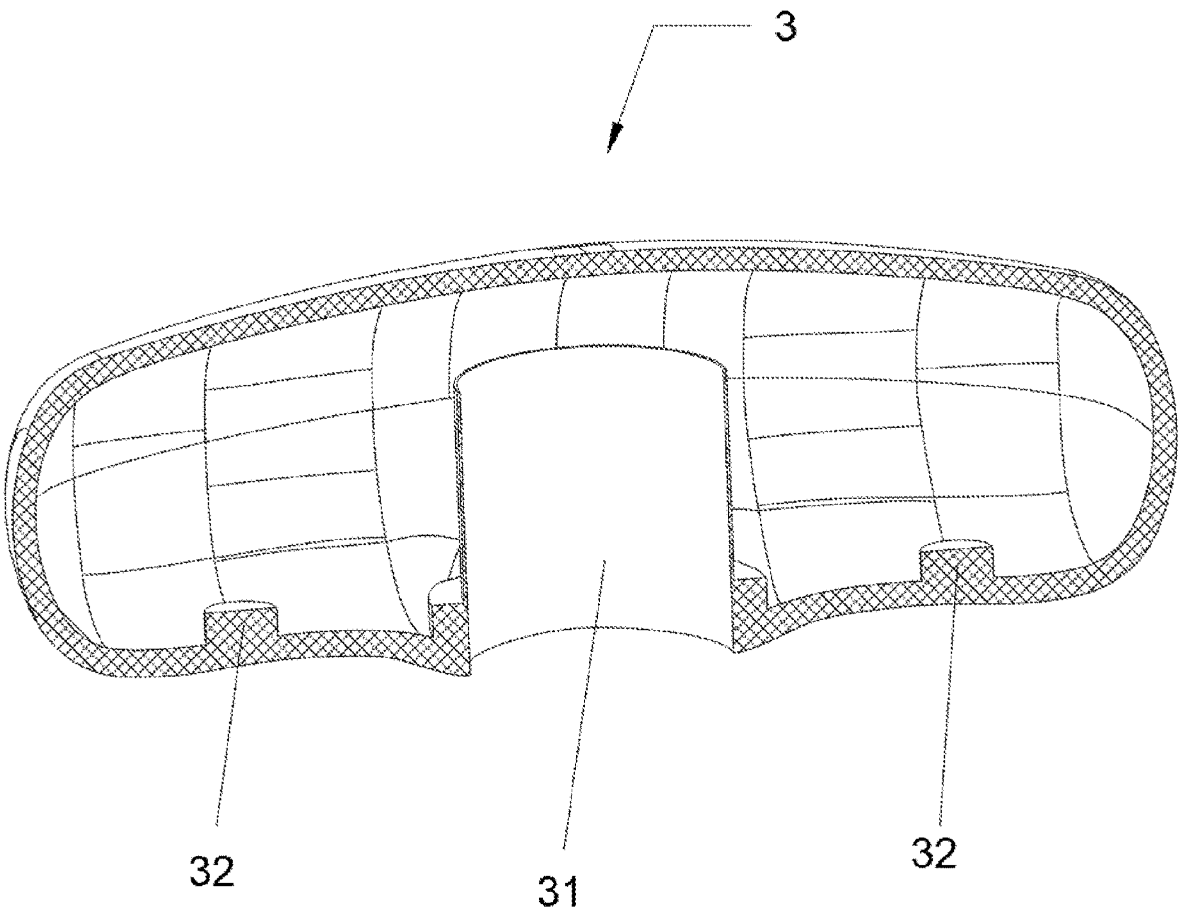
FIG. 6 is a schematic sectional view of a rubber cover.

As shown in FIG. 1 to FIG. 6, an oar grip includes an upper shell 1 and a lower shell 2 capable of being buckled with each other. An interior of each of the upper shell 1 and the lower shell 2 is of a hollow structure. A handle base 11 is disposed in a middle position inside the upper shell 1. A handle groove 12 is provided in the handle base 11. Connecting columns 13 are symmetrically disposed on two sides of the handle base 11. Threaded holes 14 are provided in the connecting columns 13. A handle column 21 is upward disposed in a middle position inside the lower shell 2. A handle hole 22 allowing a handle to penetrate through is provided in the handle column 21. A tail end of the handle column 21 extends into the handle groove 12. Stepped holes 23 coaxial with the threaded holes 14 are provided on a left and right of the handle column 21. The upper shell 1 is fixedly connected to the lower shell 2 through screws sequentially screwed into the stepped holes 23 and the threaded holes 14.

The oar grip is formed by fixedly connecting the upper shell and the lower shell through the screws, with an interior being of a hollow structure, so that the weight of the grip may be reduced, thereby allowing an athlete to paddle with less effort and being conducive to improving the performance.

A groove 15 is provided in an edge of the upper shell 1, and an insertion strip 24 matching the groove 15 is disposed at an edge of the lower shell 2, so that the upper shell and the lower shell may be closed more tightly to prevent water from entering the grip.

A plurality of first reinforcing ribs 16 are disposed around the connecting columns 13, so that the strength of the upper shell and the connecting columns may be improved.

A plurality of second reinforcing ribs 25 are disposed around the stepped holes 23, so that the strength of the lower shell and the stepped holes may be improved.

Each of two sides of the handle column 21 is provided with a third reinforcing rib 26, and the third reinforcing ribs 26 are connected to the stepped holes 23. The strength of the handle column and the stepped holes may be improved at the same time through the third reinforcing ribs.

Guide holes 27 coaxial with the stepped holes 23 are provided in tops of the stepped holes, and diameters of the guide holes 27 are greater than or equal to diameters of the connecting columns 13, so that during mounting, the connecting columns may be aligned with the stepped holes conveniently.

The upper shell 1 and the lower shell 2 are respectively sleeved with a rubber cover 3, so that when the grip is tightly gripped by a hand, on the one hand, the frictional force between the palm and the grip may be increased, and on the other hand, the skin of the palm may be prevented from being rubbed.

The rubber cover 3 includes a round-hole-shaped sleeve 31 attached to a side wall of the handle hole 22, and the round-hole-shaped sleeve extends into the handle hole, so that the rubber cover may be prevented from shifting.

The rubber cover 3 includes cylindrical plugs 32 extending into the stepped holes 23. The cylindrical plugs may serve to position the rubber cover, so as to fix the rubber cover.

The above description of the disclosed embodiments is provided to enable any person skilled in the art to implement or use the present disclosure. Various modifications to these embodiments will be readily apparent to persons skilled in the art, and the generic principles defined herein may be implemented in other embodiments without departing from the spirit or scope of the present disclosure. Thus, the present disclosure is not intended to be limited to the embodiments shown herein but is to be accorded the widest scope consistent with the principles and novel features disclosed herein.

What is claimed is:

1. An oar grip, comprising: an upper shell and a lower shell capable of being buckled with each other, an interior of each of the upper shell and the lower shell being of a hollow structure, a handle base being disposed in a middle position inside the upper shell, a handle groove being provided in the handle base, connecting columns being symmetrically disposed on two sides of the handle base, threaded holes being provided in the connecting columns; a handle column being upward disposed in a middle position inside the lower shell, a handle hole allowing a handle to penetrate through being provided in the handle column, a tail end of the handle column extending into the handle groove, stepped holes coaxial with the threaded holes being provided on a left and right of the handle column, the upper shell being fixedly connected to the lower shell through screws sequentially screwed into the stepped holes and the threaded holes.

2. The oar grip according to claim 1, wherein a groove is provided in an edge of the upper shell, and an insertion strip matching the groove is disposed at an edge of the lower shell.

3. The oar grip according to claim 1, wherein a plurality of first reinforcing ribs are disposed around the connecting columns.

4. The oar grip according to claim 1, wherein a plurality of second reinforcing ribs are disposed around the stepped holes.

5. The oar grip according to claim 1, wherein each of two sides of the handle column is provided with a third reinforcing rib, and the third reinforcing ribs are connected to the stepped holes.

6. The oar grip according to claim 1, wherein guide holes coaxial with the stepped holes are provided in tops of the stepped holes, and diameters of the guide holes are greater than or equal to diameters of the connecting columns.

7. The oar grip according to claim 1, wherein the upper shell and the lower shell are respectively sleeved with a rubber cover.

8. The oar grip according to claim 7, wherein the rubber cover comprises a round-hole-shaped sleeve attached to a side wall of the handle hole.

9. The oar grip according to claim 7, wherein the rubber cover comprises cylindrical plugs extending into the stepped holes.

* * * * *